United States Patent [19]

Onodera

[11] 4,260,053
[45] Apr. 7, 1981

[54] FLEXIBLE CONVEYOR BELT

[76] Inventor: Hirosuke Onodera, 306-3-chome Imazunaka, Tsurumi-ku, Osaka, Japan

[21] Appl. No.: 82,799

[22] Filed: Oct. 9, 1979

[51] Int. Cl.³ .............................................. B65G 21/14
[52] U.S. Cl. .................................. 198/812; 198/792; 198/831; 198/849
[58] Field of Search .............................. 198/848–849, 198/831, 853, 850, 791, 334, 812, 792; 74/245 C, 245 S, 245 LP, 250 R, 250 S, 250 C, 251 R, 251 C, 251 S

[56] References Cited

U.S. PATENT DOCUMENTS

| | | | |
|---|---|---|---|
| 1,787,063 | 12/1930 | Cano | 198/849 |
| 2,063,017 | 12/1936 | Anderson | 74/251 R |

*Primary Examiner*—Robert B. Reeves
*Assistant Examiner*—Douglas D. Watts

*Attorney, Agent, or Firm*—George B. Oujevolk

[57] ABSTRACT

The invention relates to a flexible conveyor belt wherein two pairs of links at one end thereof are respectively and rotatably fitted onto each end of transverse rods disposed with regular spacings from each other. One pair of the said links are rotatably connected with a pair of links fitted onto a preceding transverse rod, while the other pair thereof is rotatably connected with a pair of links fitted onto a succeeding transverse rod. These are characterized in that the center of a connecting spindle rotatably connecting the links of the said preceding and succeeding transverse rods is adapted to be located below the center line connecting the centers of the transverse rod receiving holes in the state in which the connected links are rectilineally extended. This enables the flexible conveyor belt to expand, contract and bend systematically with a small curcature radius and smooth and noiseless movement.

1 Claim, 7 Drawing Figures

FLEXIBLE CONVEYOR BELT

The invention basically relates to a flexible conveyor belt of a system in which transverse rods are disposed with regular spacings, both ends of the said transverse rods being connected with links, each to each.

The conventional belt of this system comprised undulantly bent plates, transverse rods being connected by fitting them onto forward and rearward adjacent bent plates, or transverse rods disposed with regular spacings connected at both ends thereof by means of links, transverse rod receiving holes being formed into elongated holes thereby enabling them to contract the conveyor belt at one side thereof by making use of the length of the elongated holes in which the transverse rods can float. This system, however, has a disadvantage in that the curvature radius of the belt is large due to a small ratio of expansion and contraction. The expansion and contraction of the belt also are accompanied by noise and deprived of smoothness.

The invention has for an object to provide a novel conveyor belt completely free from the aforesaid demerits. It is characterized in that two pairs of links are rotatably fitted at one end thereof onto both ends of transverse rods, which are placed in parallel, with one pair of the said links being rotatably connected at one end thereof to one end of a pair of links fitted onto a preceding transverse rod by means of a connecting spindle. The other pair of said links being rotatably connected by a connecting spindle to a pair of links fitted onto a succeeding transverse rod. These transverse rods are thus connected in sequence with each other by means of two pairs of links thereby enabling them to freely reduce the distance between the transverse rods at one optional side of the belt by means of the rotary bending of the links relative to the transverse rods.

The invention is further characterized in that the center of the spindle connecting the links fitted onto a forward transverse rod and a rearward transverse rod is adapted to be located a trifle below the line connecting the centers of the transverse rod receiving holes in the state in which each link is rectilineally extended thereby enabling the said connecting spindle to permanently rotate and bend downward. The object of this arrangement is to increase the expansion and contraction ratio of the distance between the transverse rods thereby enabling them to freely contract the belt at one optional side thereof and thus greatly reduce the curvature radius of the belt compared with the case of the conventional belt. Furthermore, it enables them to smooth the expansion and contraction of the belt with reduced noise. Moreover, since the links are systematically folded due to the permanently downward rotation thereof, the expansion and contraction of the belt is stabilized and free from irregular vibration and the like.

The advantages and features of the invention, which can display novel effects according to its use, will become apparent from the embodiments described hereinunder.

Figure 1:
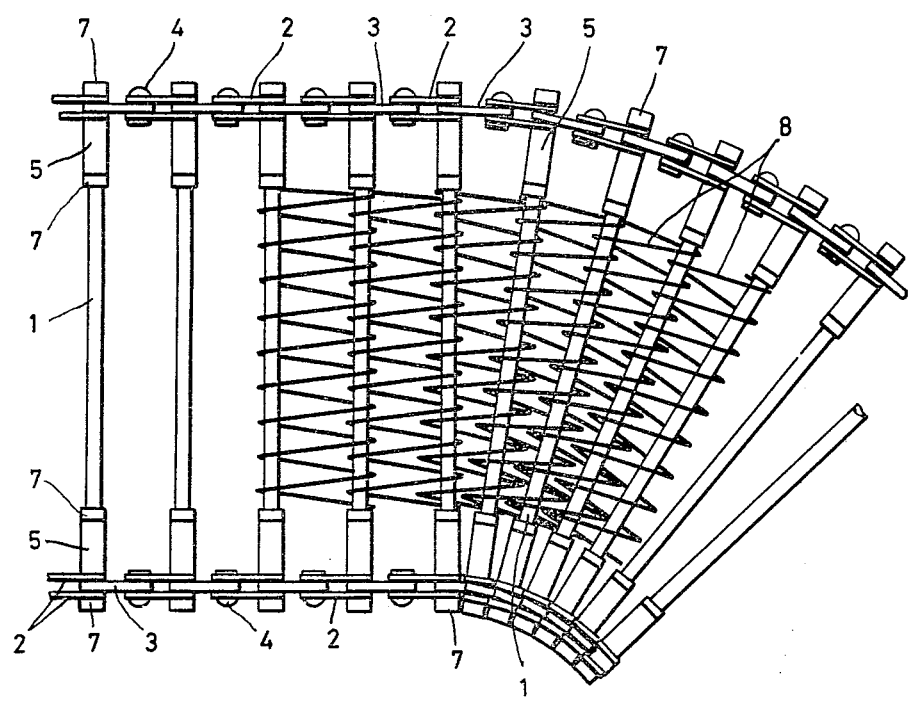
FIG. 1 is a fragmentary plan view of the conveyor belt according to the invention.
Figure 2:
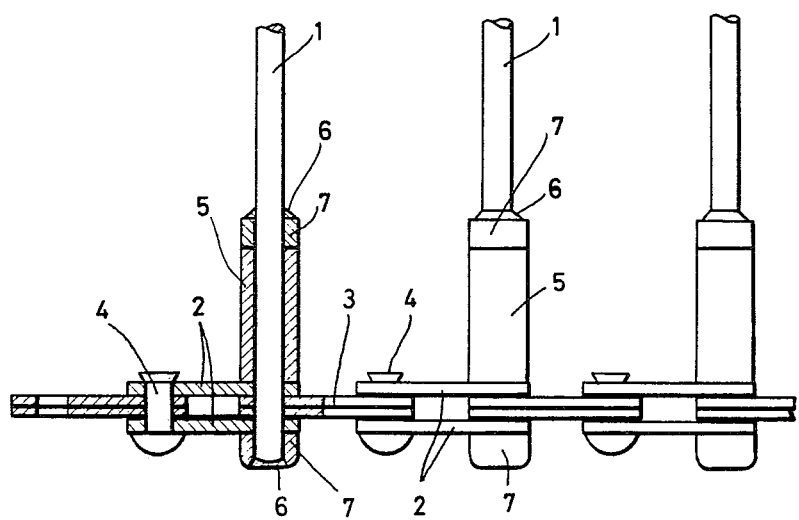
FIG. 2 is a plan view, on a magnified scale in part, of the principal part of the same.
Figure 3:
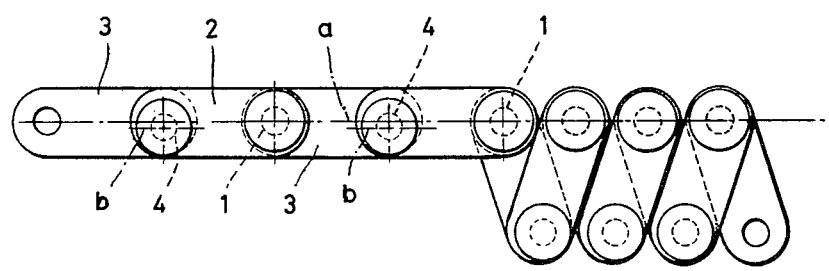
FIG. 3 is an elevation of FIG. 2.

Referring to FIGS. 1 and 3, two pairs of links 2, 3 are rotatably fitted at one end thereof respectively onto both ends of transverse rods 1 disposed in parallel, the end of the said link 2 and the end of link 3 fitted onto a preceding transverse rod 1 being rotatably connected by a connecting spindle 4, the link 3 being rotatably connected to the link 2 fitted onto a succeeding transverse rod 1 by a connecting spindle 4, a plurality of transverse rods being connected to each other sequentially in the same manner. On the inside of the links 2,3 of each transverse rod 1 are preliminarily fitted rollers 5,5, the inside of the said roller 5 and the outside of the said links 2, 3 being supported by check rings 7,7 welded to the transverse rod 1 with a small space of play for permitting bending of the belt. The links 2, 3 consist of composite links in which a single link is superposed one over the other and the superposed links are interposed between single links as shown in FIG. 2. The composite links may be replaced by single links. The center of the connecting spindle 4 connecting the said links 2, 3 is adapted to be located on the line (b) which is a trifle lower than the line (a) connecting the centers of the transverse rod receiving holes in the state in which the links 2, 3 are rectilineally extended.

In the aforementioned construction, if the drive speed on one side of the belt is reduced relative to that on the other side of the belt, the links 2, 3 on the side of lower drive speed are rotated, whereby the distance between the forward and rearward transverse rods 1, 1 is reduced and the belt is curved. As shown on the right side of FIG. 3, the links can be contracted until they are brought into contact with each other. This design enables a transportation route having a large expansion and contraction ratio and a small rotation radius.

According to the invention, as described hereinbefore, the conveyor surface is basically constituted by transverse rods disposed in parallel. If the distance between the transverse rods is too great due to great length of the links, or if the length of the transverse rods is great and the distances between the transverse rods are very much different on the outside and inside of the curved part of the belt so much so that is is not suitable for carrying small articles, the impediment can be prevented by winding a flat spiral wire around the adjacent transverse rods as shown in FIG. 1. In this case, the upper face of the said flat spiral wire constitutes a conveyor surface.

Figure 4:
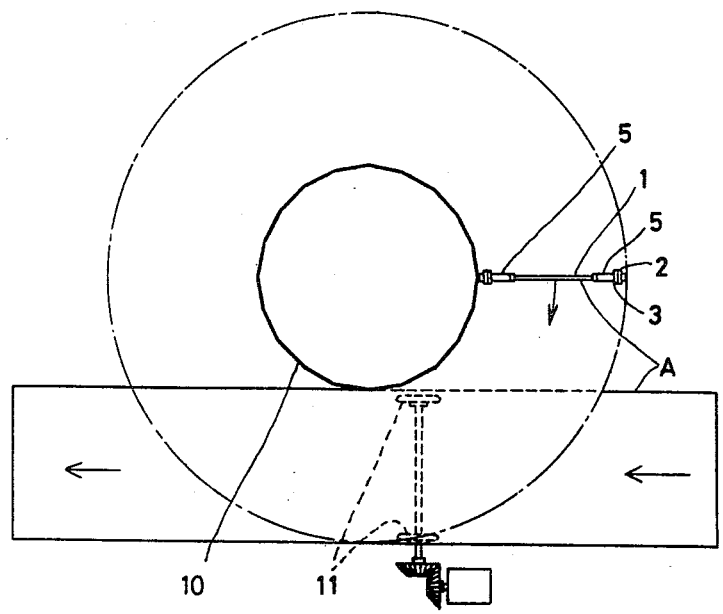
FIGS. 4 and 5 are a plan view and an elevational view, respectively, of the embodiment when applied to a spiral conveyor belt.
Figure 5:
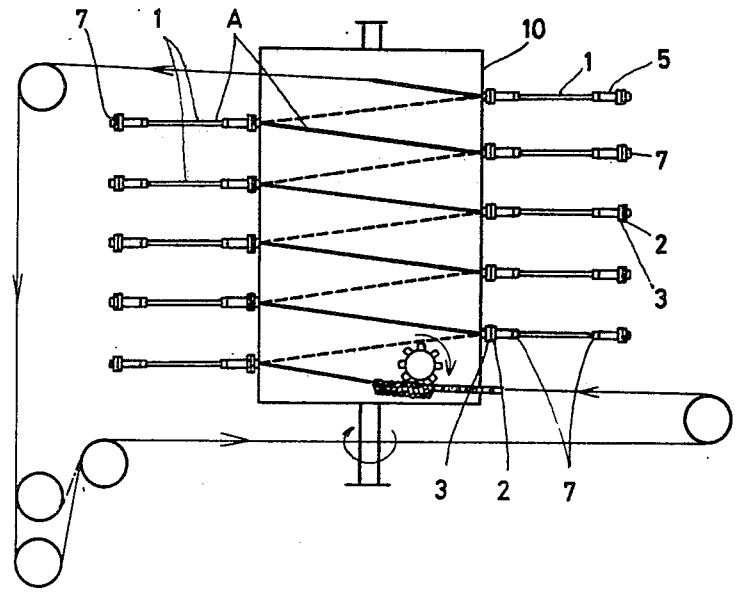

FIGS. 4 and 5 show an example of the commonly known spiral conveyor spirally driven on the outer periphery of a central barrel 10. Immediately before the conveyor belt (A) according to the invention winds itself round the central barrel 10, the links 2, 3 are turned into a folded state by a low speed feed gear 11, whilst when the belt has wound itself round the central barrel 10 the links 2, 3 on the outer peripheral side are driven so as to be in the state of expansion. If the rotary radius of the belt is small, the diameter of the central barrel can be reduced thereby creating a conveyor occupying a small space.

Figure 6:
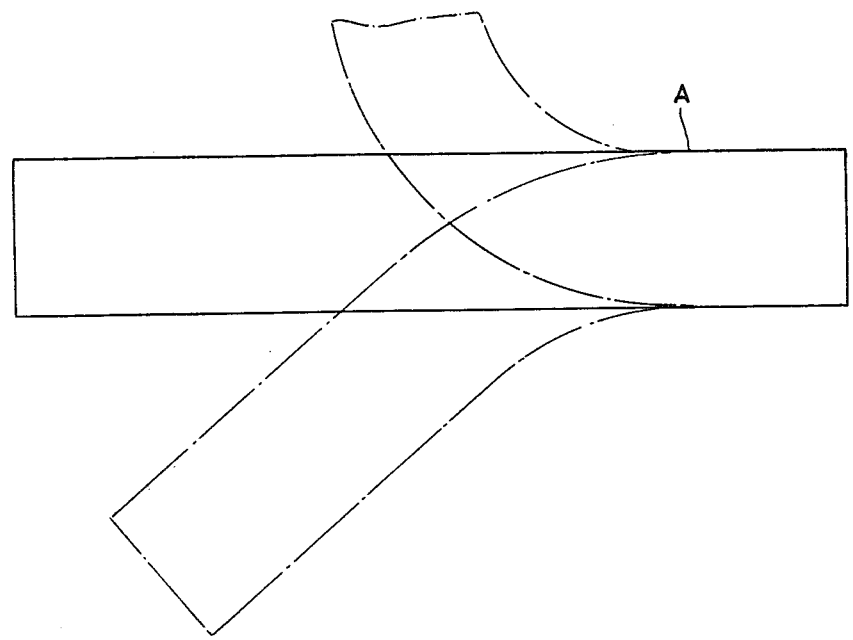
FIG. 6 is a plan view of a curved conveyor belt.

FIG. 6 shows an instance in which the conveyor (A) is applied to a curvature use. Since the rotary radius can be reduced, the conveyor route can be converted with rapidity and the space required for the conversion can be reduced. Thus, the conversion angle can be selected in a wide range according to the location and purpose of use.

Figure 7:
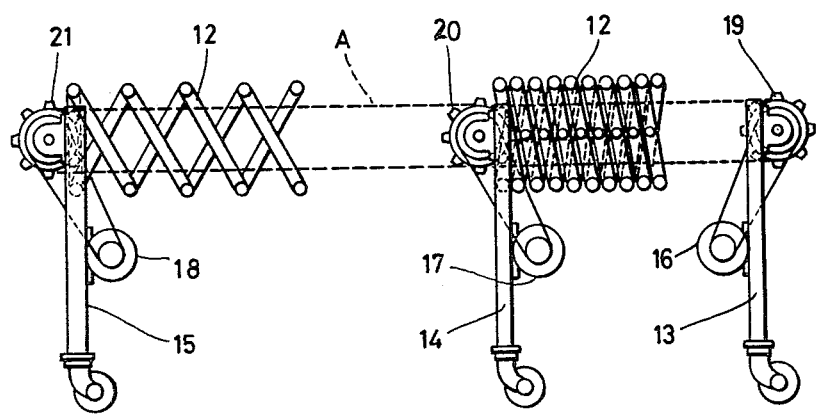
FIG. 7 is a side view of an expansion and contraction conveyor belt.

FIG. 7 shows an instance in which the route of the conveyor (A) is substantially increased or decreased, or the speed thereof is locally increased or decreased. A flexibly constructed supporting frame 12 is mounted on supporting legs 13, 14, 15 . . . , the conveyor belt (A) being supported by commonly known supporting means provided on the said supporting frame, the said conveyor belt (A) being driven by drive gears 19, 20, 21 rotated by drive motors 16, 17, 18 . . . If the speed of feeding the conveyor belt (A) by the drive gear 20 is reduced relative to that of the drive gears 19, 21 by decreasing the distance between the supporting legs 13, 14, the surplus length of the conveyor belt (A) resultant from the curtailment of the distance between the supporting legs 13, 14 is offset by the constriction of the links between the feed gears 19, 20, whilst the links 2, 3 between the feed gears 20, 21 and the feed gears 21, 19 are extended and driven at normal speed, whereby the carrying distance is substantially decreased. Since this results in a local variation of the carrying speed of the conveyor belt, the arrangement can be conveniently utilized for an automatic manufacturing machine which is adapted to process an article whilst it is carried on a conveyor belt.

In all the aforementioned examples of use, which are not be be construed to limit the scope of the invention, the advantages and features of the invention can be fully utilized.

What is claimed is:

1. A flexible conveyor belt, comprising in combination:
   (a) an elongated belt-like structure with a plurality of substantially idential transverse rods (1) each with two outer ends, said rods being normally disposed parallel to each other, with a side structure having parallel defined outer sides;
   (b) link means (2, 3) defining said parallel outer sides, said link means having first and second links with inner link ends pivotally connected to each other and outer link ends pivotally connected to said rod outer ends, said link means defining the inner side of said link rods (1);
   (c) rollers (5) fitted to said inner side of said rods;
   (d) a wire spirally wound around adjacent transverse rods so as to wrap spirally the first and second, the second and third rod in this sequence;
   (e) a flexible supporting telescoping frame (12) for supporting said belt-like structure having gear means (19) with gear drive means (13) mounted on said frame, said gear means (19) engaging said rods (1) to drive said belt-like structure, whereby the telescoping and untelescoping of said supporting frame results in the folding and unfolding of said links, impeding pile-up of said belt-like structure.

* * * * *